United States Patent
Park et al.

(10) Patent No.: US 7,614,314 B2
(45) Date of Patent: Nov. 10, 2009

(54) APPARATUS FOR CLASSIFYING VEHICLE OCCUPANT

(75) Inventors: Chun Seok Park, Gwangmyeong-si (KR); Jae Haeng Yoo, Yongin-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 11/972,424

(22) Filed: Jan. 10, 2008

(65) Prior Publication Data

US 2009/0126513 A1 May 21, 2009

(30) Foreign Application Priority Data

Nov. 21, 2007 (KR) .................... 10-2007-0119342

(51) Int. Cl.
*G01L 1/12* (2006.01)
(52) U.S. Cl. ................................ 73/862.626
(58) Field of Classification Search .............. 73/780, 73/862.626
See application file for complete search history.

(56) References Cited

U.S. PATENT DOCUMENTS

| | | | |
|---|---|---|---|
| 3,668,698 A * | 6/1972 | Demirdjioghlou et al. .... 341/33 |
| 6,757,602 B2 * | 6/2004 | Breed et al. .................... 701/45 |
| 6,771,175 B1 * | 8/2004 | Eagle et al. .............. 340/573.1 |
| 6,927,678 B2 * | 8/2005 | Fultz et al. .................. 340/438 |
| 7,088,113 B2 * | 8/2006 | Basir et al. .................. 324/663 |
| 7,271,730 B2 * | 9/2007 | Kimura et al. .............. 340/667 |

* cited by examiner

*Primary Examiner*—Max Noori
(74) *Attorney, Agent, or Firm*—Morgan, Lewis & Bockius LLP

(57) ABSTRACT

An apparatus for classifying a vehicle occupant to determine whether to deploy an airbag is disclosed. The classification apparatus includes a sensor which is installed in a seat of a vehicle and is supplied with AC power, the sensor having a sensing conductor and a guard conductor electrically connected to each other, with an insulator interposed therebetween. A controller compares an imaginary current value, attributable to variation in capacitance of the sensor, measured on an output side of the sensor, and a real current value, attributable to variation in resistance of the sensor, with preset threshold values, thus classifying an occupant who is sitting in the seat. According to the classification apparatus, even if moisture permeates into a seat, an occupant can be precisely classified using the real current value and the imaginary current value.

1 Claim, 7 Drawing Sheets

APPARATUS FOR CLASSIFYING VEHICLE OCCUPANT

CROSS-REFERENCE TO RELATED APPLICATIONS

This application claims priority to Korean Application No. 10-2007-0119342, filed on Nov. 21, 2007, the disclosure of which is incorporated herein by reference.

BACKGROUND OF THE INVENTION

1. Field of the Invention

The present invention relates to an apparatus for classifying a vehicle occupant which classifies a vehicle occupant sitting in the seat of a vehicle in order to deploy an airbag in accordance with an occupant's age equal to or greater than certain age or certain physical requirements.

2. Description of the Related Art

Recently, in many cases, an airbag is installed for a passenger seat, as well as a driver seat, for the safety of vehicle occupants.

Such an airbag is deployed when a collision between vehicles occurs, thus protecting vehicle occupants. In the case of an adult, there is no problem when using an airbag, but in the case of a small child, a deployed airbag may act as a dangerous factor that threatens the life thereof. Therefore, whether an airbag for a passenger seat is to be deployed must be determined differently depending on the type of vehicle occupant. For this determination, a variety of research on and development of a vehicle occupant classification apparatus for classifying a vehicle occupant sitting in a seat have been actively conducted.

A vehicle occupant classification apparatus, which is generally used at the present time, basically classifies an adult and a child by measuring the weight of an occupant sitting in a seat, and additionally considers the shape of the hip of an occupant. However, as shown in FIG. 1, in such a conventional vehicle occupant classification apparatus, since the difference between the weights of an occupant, measured by a sensor according to the variation in the posture of the occupant, is large, errors frequently occur in classifying an occupant.

Further, the conventional vehicle occupant classification apparatus is problematic in that, since a hard plastic mat, having a sensor therein, must be installed under a seat cover, or, alternatively, a separate structure must be installed in the seat, the plastic mat or separate structure acts as a factor that limits the design of seats.

Accordingly, a new system for classifying a vehicle occupant is proposed in Korean Pat. Appln. No. 2007-0067276 (filed on Jul. 4, 2007). This system is constructed to measure variation in the amount of charge attributable to an occupant sitting in a seat, that is, current variation, and to determine whether an occupant is seated and which type of occupant is sitting, using the current variation. The measurement of current variation is performed using the principles in which the capacitance formed between a vehicle body and a conductor installed under a seat cover varies according to the permittivity of an occupant sitting in the seat and in which the amount of charge varies according to the variation in capacitance.

However, as shown in FIG. 2, in the vehicle occupant classification system, when moisture permeates into the seat, errors may occur in the classification of occupants. Since moisture has high permittivity and relatively low resistance, the current value measured by the sensor in the seat increases when moisture permeates into the seat. Therefore, even if an occupant is a small child, the current value increases due to the moisture (that is, above a threshold value), and thus there is the probability of the occupant being erroneously determined to be an adult and an airbag being deployed.

The information disclosed in this Background of the Invention section is only for enhancement of understanding of the background of the invention and should not be taken as an acknowledgement or any form of suggestion that this information forms the prior art that is already known to a person skilled in the art.

SUMMARY OF THE INVENTION

Accordingly, the present invention has been made keeping in mind the above problems occurring in the prior art and an object of the present invention is to provide an apparatus for classifying a vehicle occupant which can classify a vehicle occupant without causing errors even if moisture permeates into a seat.

In order to accomplish the above object, the present invention provides an apparatus for classifying a vehicle occupant comprising a sensor installed in a seat of a vehicle and supplied with Alternating Current (AC) power, the sensor having a sensing conductor and a guard conductor electrically connected to each other with an insulator interposed therebetween; and a controller for comparing an imaginary current value, attributable to variation in capacitance of the sensor, measured on an output side of the sensor, and a real current value, attributable to variation in resistance of the sensor, with a preset threshold value, thus classifying an occupant sitting in the seat.

The vehicle occupant classification apparatus is implemented in consideration of the fact that, when moisture permeates into a seat, a sensor circuit in the seat can be assumed to be an RC circuit, and that, when AC voltage is applied to the RC circuit the phase of the current output from a resistor (R) is equal to that of the input voltage, and the phase of the current output from a capacitor (C) lags behind that of the input voltage by 90°.

Preferably, the controller may measure output current values of the sensor at different time points, thus obtaining the imaginary current value and the real current value. In particular, the controller measures output current values of the sensor corresponding to a time point at which amplitude of an input voltage of the sensor is a peak value, and a time point at which the amplitude thereof is zero, thus obtaining the imaginary current value and the real current value.

Preferably, the threshold value may be a combination of a reference imaginary current value and a reference real current value corresponding to a measured imaginary current value and a measured real current value.

Preferably, the threshold value may be an experimental value previously derived from imaginary current values and real current values, which are measured while a type of occupant is changed according to a degree of wetting of the seat, and may be variable depending on the degree of wetting of the seat.

Preferably, the apparatus may further comprise a diode interposed between the sensing conductor and the guard conductor.

The above features and advantages of the present invention will be apparent from or are set forth in more detail in the accompanying drawings, which are incorporated in and form a part of this specification, and the following Detailed Description of the Invention, which together serve to explain by way of example the principles of the present invention.

BRIEF DESCRIPTION OF THE DRAWINGS

The above and other features of the present invention will now be described in detail with reference to certain exemplary embodiments thereof illustrated the accompanying drawings which are given hereinbelow by way of illustration, and thus are not limitative of the present invention and wherein.

Figure 1:
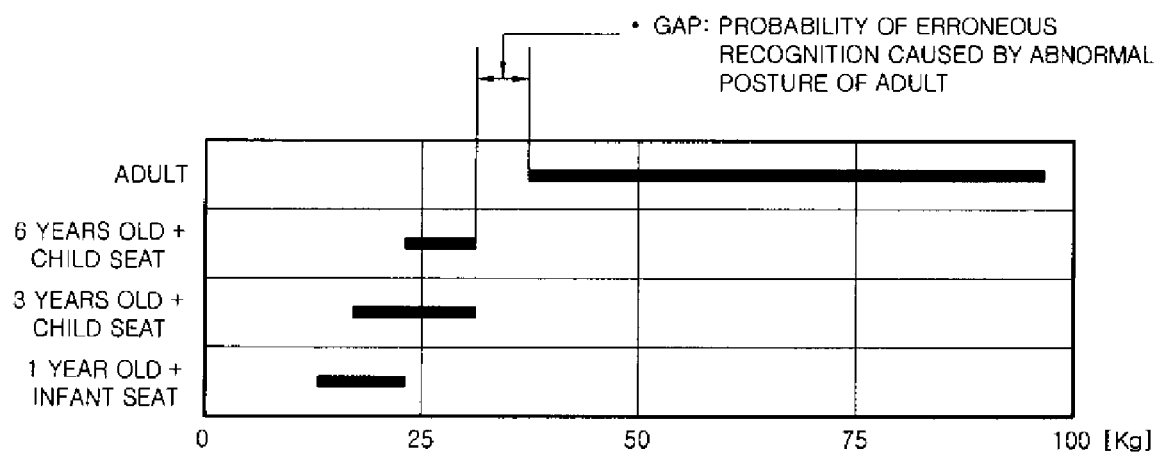
FIGS. 1 and 2 are diagrams showing a problem occurring in the determination of conditions in which an airbag is to be deployed using a conventional apparatus for classifying a vehicle occupant.
Figure 2:
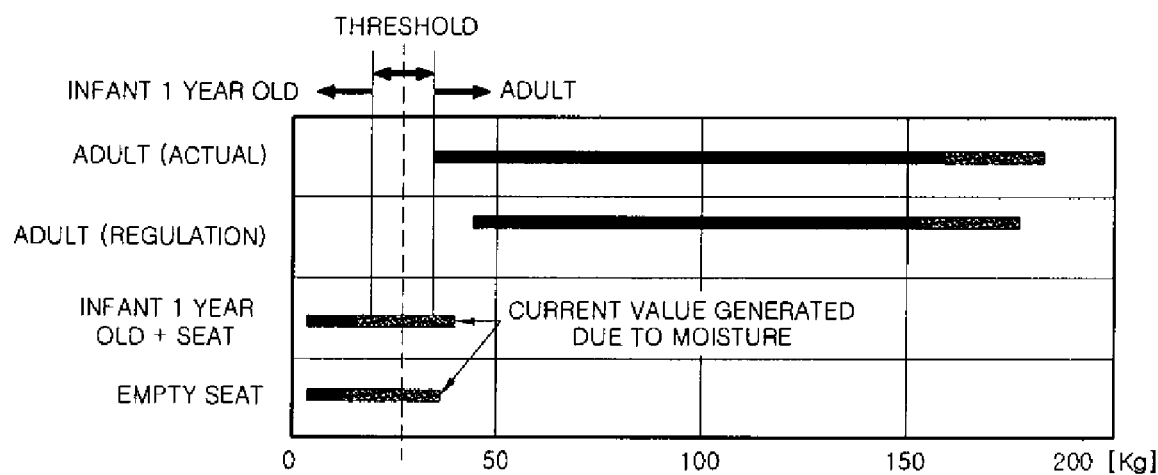

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DESCRIPTION OF THE PREFERRED EMBODIMENTS

Reference will now be made in detail to a preferred embodiment of the present invention, an example of which is illustrated in the accompanying drawings and described below. While the invention will be described in conjunction with an exemplary embodiment it should be understood that the description is not intended to limit the invention to the exemplary embodiment. On the contrary, the invention is intended to cover not only the exemplary embodiment, but also various alternatives, modifications, equivalents and other embodiments, which may be included within the spirit and scope of the invention as defined by the appended claims.

Figure 3:
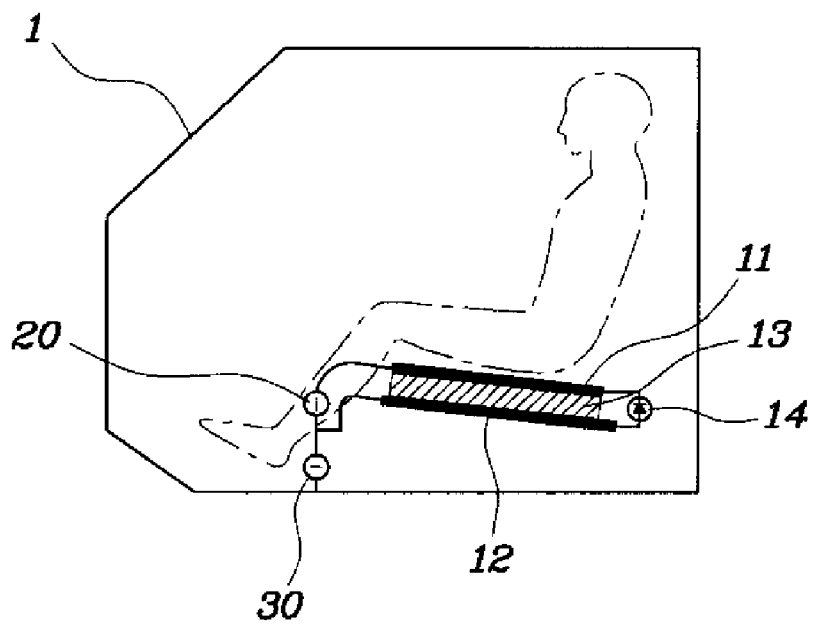
FIG. 3 is a diagram schematically showing the construction of an apparatus for classifying a vehicle occupant according to an exemplary embodiment of the present invention.

With reference to FIG. 3, the basic construction of an apparatus for classifying a vehicle occupant is described in detail.

The vehicle occupant classification apparatus is constructed such that AC power 20 is supplied to a sensor 10 installed under a seat cover (not shown), and a controller 30 classifies a vehicle occupant using the output current of the sensor 10. The sensor 10 comprises an upper sensing conductor 11 and a lower guard conductor 12, which are electrically connected to each other, are arranged opposite each other, and an insulator 13 is interposed therebetween.

The upper sensing conductor 11 may be formed of gold foil or silver foil, which has high conductivity, or of a patch covered with such a conductive material. The lower guard conductor 12 is used to isolate the upper sensing conductor 11 from the influence of variation in the amount of charge generated below the lower guard conductor 12, so that the upper sensing conductor 11 can transmit variation in current, attributable to an occupant seated on the upper sensing conductor 11, to an ammeter 31.

Further, the lower guard conductor 12 can be formed of material equal to or similar to that of the upper sensing conductor 11. However, the lower guard conductor 12 is preferably larger than the upper sensing conductor 11 so that the upper sensing conductor 11 can be isolated from a vehicle body 1 under the sensing conductor 11 due to their differences of size.

A diode may be disposed between the upper sensing conductor 11 and the lower guard conductor 12. The diode 14 is configured so that current flows only in a forward direction from the lower guard conductor 12 to the upper sensing conductor 11, and little current flows in a reverse direction. This is useful for the self-diagnosis of the vehicle occupant classification apparatus. A detailed description thereof is disclosed in Korean Pat. Appln. No. 2007-0067276.

The controller 30 measures output current using the ammeter 31 installed at the output terminal of the sensor 10, and determines the type of occupant based on the output current and a threshold value. The results of this determination are transmitted to an airbag unit.

With reference to FIGS. 4 to 9 together with FIG. 3, the occupant classification logic of the controller 30 using the output current of the sensor 10 is described below.

Figure 4:
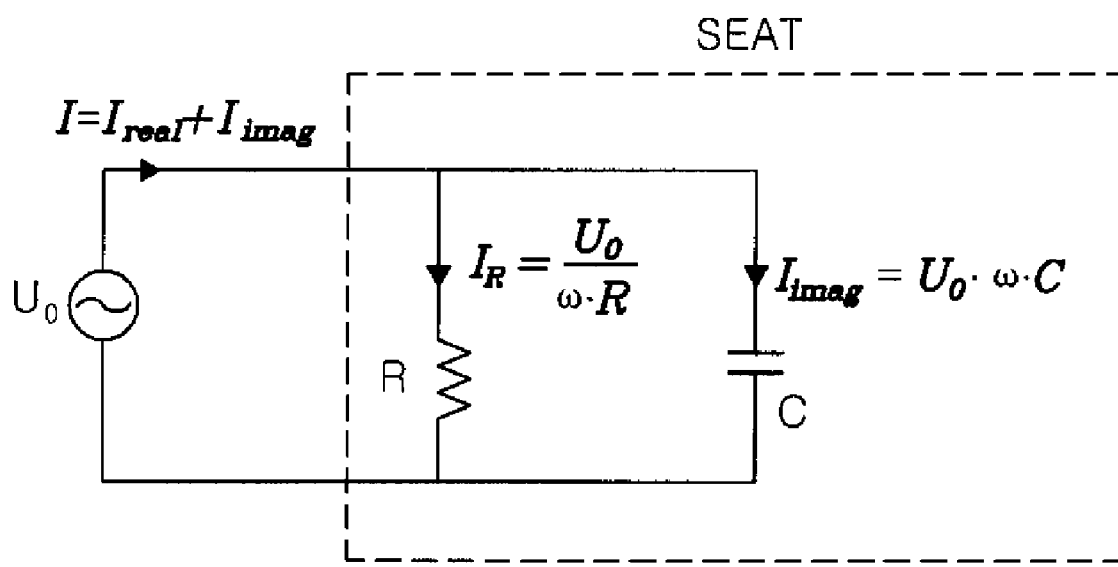
FIG. 4 is a diagram showing a sensor circuit which is influenced by moisture when moisture permeates into a seat equipped with the classification apparatus of FIG. 3, in the form of a simple equivalent circuit.
Figure 5A:
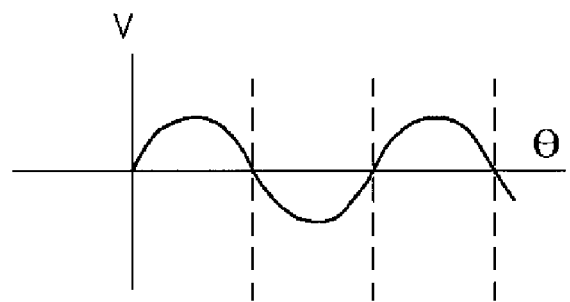
FIGS. 5A to 5D are diagrams showing the waveform characteristics of output current relative to input voltage on the basis of the equivalent circuit of FIG. 4.
Figure 5B:
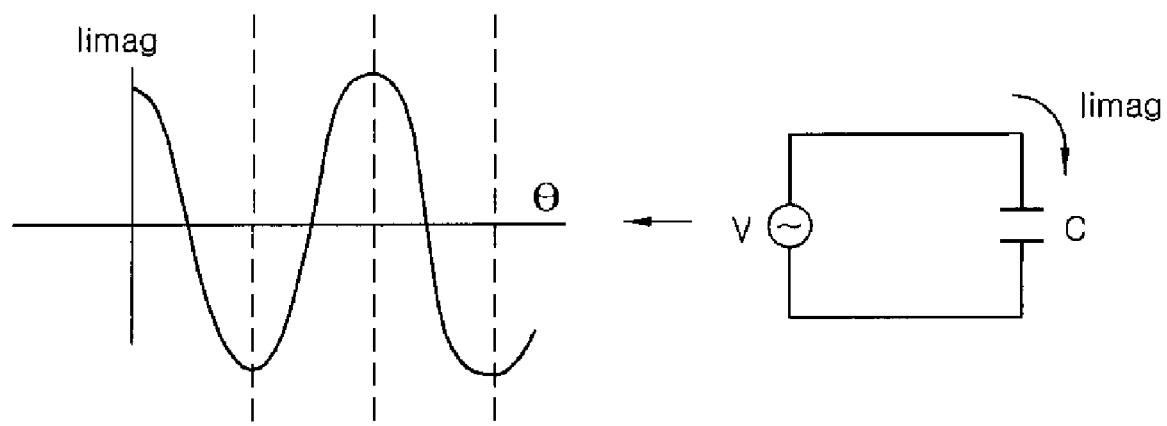
Figure 5C:
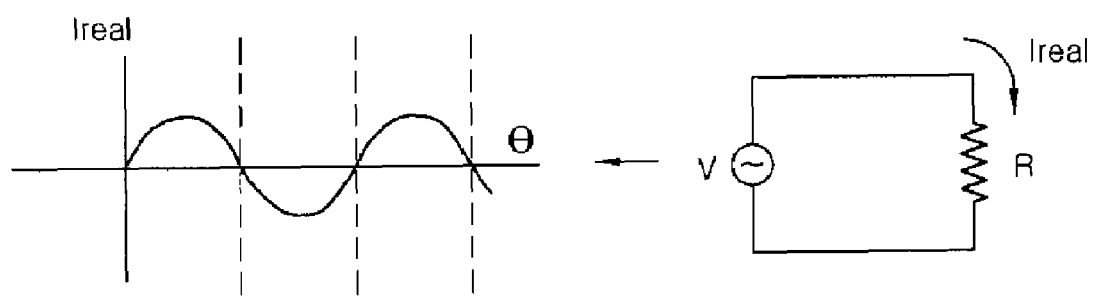
Figure 5D:
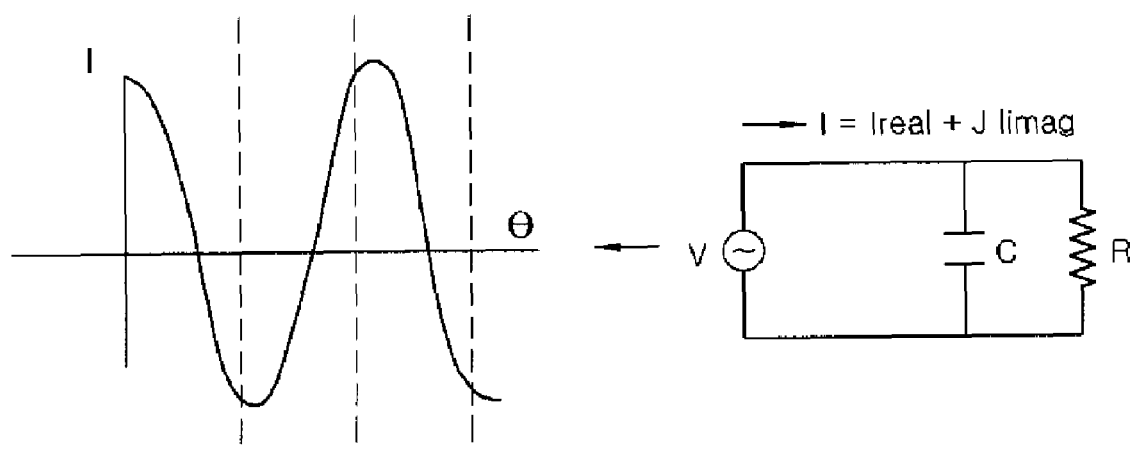

As shown in FIG. 4, when water permeates into a seat, the sensor circuit can be considered to be an equivalent circuit of an RC circuit. That is, the upper sensing conductor 11 and the lower guard conductor 12 of the sensor 10 can be represented by a capacitor C, and the resistance, reduced between the upper sensing conductor 11 and the lower guard conductor 12 due to moisture, can be represented by the resistor R of the equivalent circuit of FIG. 4.

At the resistor R, the increase of current caused by the influence of moisture on the resistor is measured, and at the capacitor C, the increase of permittivity and the increase of current caused by an occupant sitting in the seat are measured. Of course, the current value of the capacitor C reflects the increased permittivity due to moisture. The input current in the RC circuit is the sum of the current values of the resistor R and the capacitor C, and thus the output current I of the sensor 10 measured by the ammeter 31 may be the sum of the real current $I_{real}$ of the resistor R and the imaginary current $I_{imag}$ of the capacitor C.

With reference to FIGS. 5A to 5D, the relationship between the phases of the voltage and current supplied to the RC circuit is described. The real current $I_{real}$ has a phase equal to that of the input voltage V, and the imaginary current $I_{imag}$ has a phase lagging behind that of the input voltage V by 90°. Further, the amplitude of the output current I is the sum of the amplitudes of the real current and the imaginary current. Therefore, when this relationship is used, respective values of the real current and the imaginary current can be obtained from the output current I of the sensor 10. That is, at the time point at which the amplitude of the real current is a peak value, the amplitude of the imaginary current is zero. At the time point at which the amplitude of the real current is zero, the amplitude of the imaginary current is a peak value. Therefore, the time points at which the imaginary current and the real current are measured are derived, and, at those time points, the output current of the sensor 10 is measured, so that the real current value and the imaginary current value can be obtained.

Figure 6:
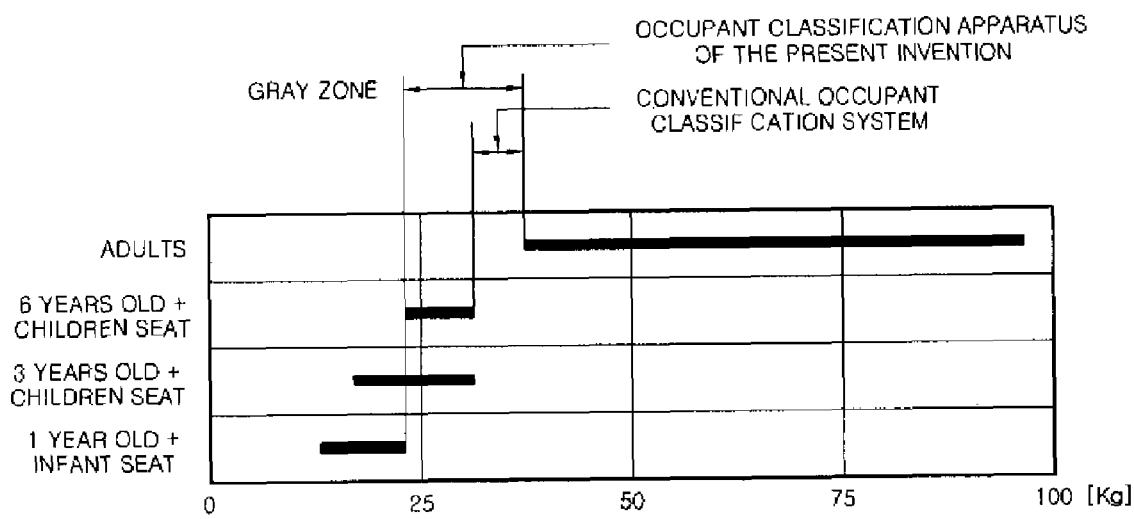
FIG. 6 is a diagram showing criteria for airbag deployment conditions using the vehicle occupant classification apparatus according to an exemplary embodiment of the present invention in comparing a conventional art.
Figure 7:
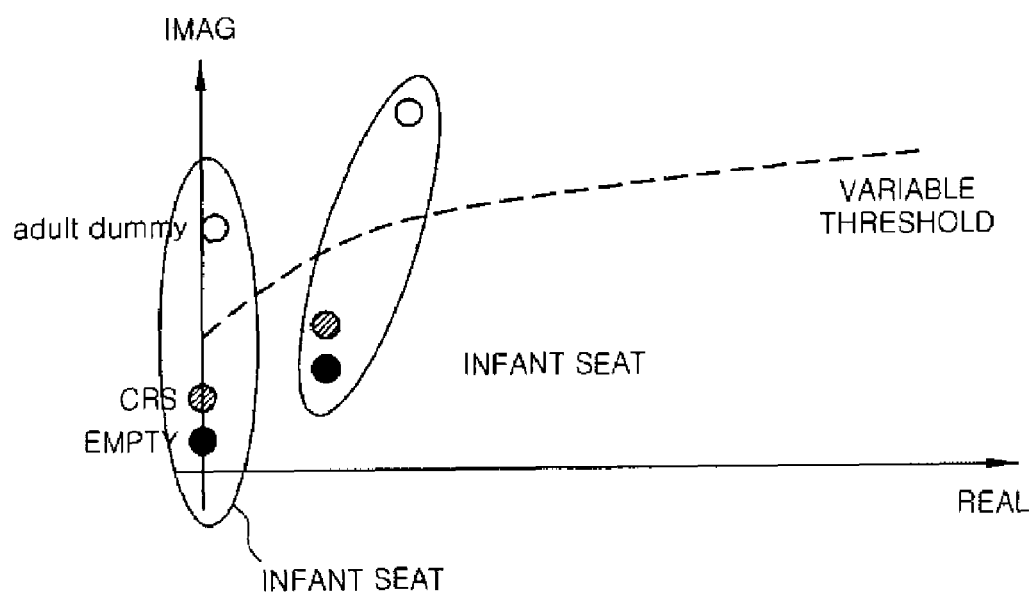
FIG. 7 is a diagram showing a process for deriving a variable threshold value according to an exemplary embodiment of the present invention.

With reference to FIGS. 6 and 7, a method of deriving a threshold value required to classify a vehicle occupant is described in accordance with an exemplary embodiment of the present invention.

First, the vehicle occupant classification apparatus classifies an occupant by determining only whether the occupant sitting in the seat is an adult or an infant 1 year old or younger. In the prior art, the target for which an airbag is not to be deployed is a small child 6 years old or younger. However, when the target is changed to an infant 1 year old or younger, the gap between an infant and an adult is greatly increased compared to the prior art, as shown in FIG. 6, and thus the probability of the erroneous classification of an occupant by this apparatus is greatly decreased.

In this case, since an airbag will be deployed even for small children 3 or 6 years old, there is a burden in that the extent of injury to children caused by the deployment of an airbag is required to be sufficiently decreased. However, recently, airbags softer than conventional airbags have been developed, so that the criteria for selecting the target for which an airbag is not to be deployed have changed for the better.

The threshold value is obtained through repetitive experiments on an empty seat, Child Restraint System (CRS) for an infant 1 year old or younger, and an adult dummy. The experiments can be conducted in such a way that the output current values of the sensor 10 are measured to obtain real current values and imaginary current values at various conditions that the amount of wetting of the seat is different, with respect to each of the empty seat, CRS for an infant 1 year old or younger, and the adult dummy. Accordingly, data sets including pairs of the real current values and the imaginary current values, for the empty seat, CRS for an infant 1 year old or younger, and the adult dummy, are obtained. Through these experiments, a graph can be obtained haying x-axis for a real value and y-axis for a imaginary value, as shown in FIG. 7, on which the measured values of the real current and the imaginary current, for the empty seat, CRS for an infant 1 year old or younger, and the adult dummy, are marked. Referring to FIG. 7, a variable threshold value, required to distinguish an infant from an adult, is obtained by adopting intermediate values between the imaginary current values of the adult dummy and the CRS. It can be said that the variable threshold value is composed of a threshold data set including predetermined pairs of reference imaginary current values and reference real current values. The reference imaginary value corresponds to the imaginary value of the intermediate value, and the reference real current value corresponds to the real value of the intermediate value.

Meanwhile, the controller 30 obtains the imaginary current value and the real current value by measuring at the output terminal of the sensor 10 at different points in time, and compares the measured current values with the variable threshold value, thus classifying an occupant.

For example, after the real current value is measured to match the reference real current value, if the measured imaginary current value is greater than the reference imaginary current value, the occupant is determined to be an adult, and if the measured imaginary current value is less than the reference imaginary current value, the occupant is determined to be an infant 1 year old or younger. In other words, a method for classifying a vehicle occupant comprises determining a reference imaginary current value being paired with a reference real current value which corresponds to the measured real current value and comparing the measured imaginary current value with the reference imaginary current value.

Figure 8:
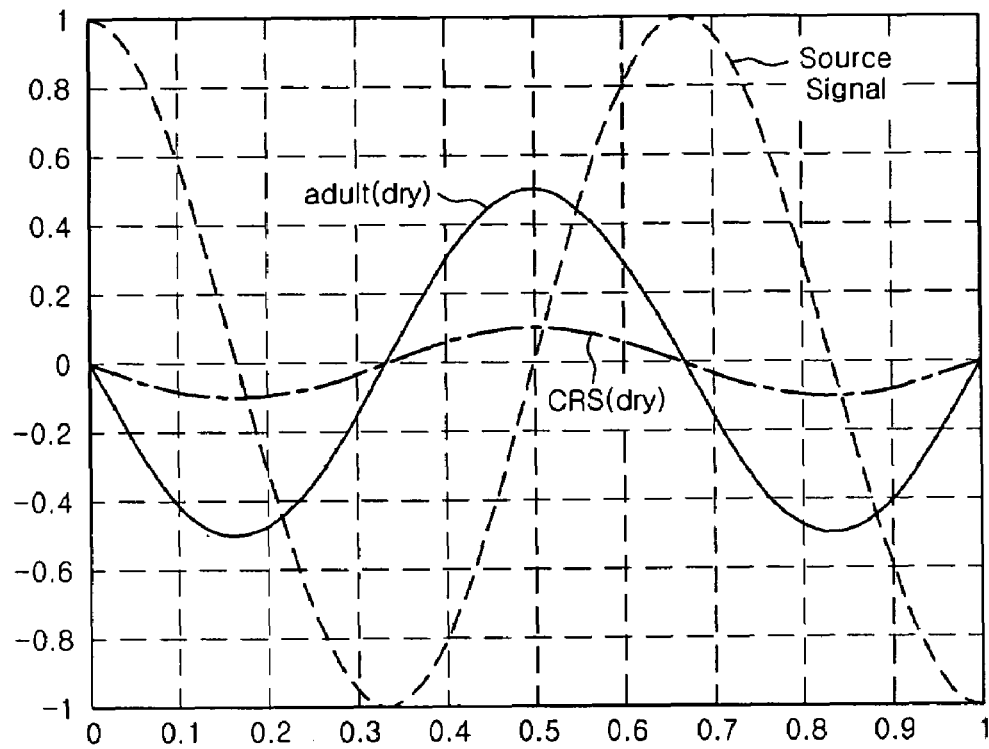
FIGS. 8 to 10 are diagrams showing the experimental result data according to an exemplary embodiment of the present invention.
Figure 9:
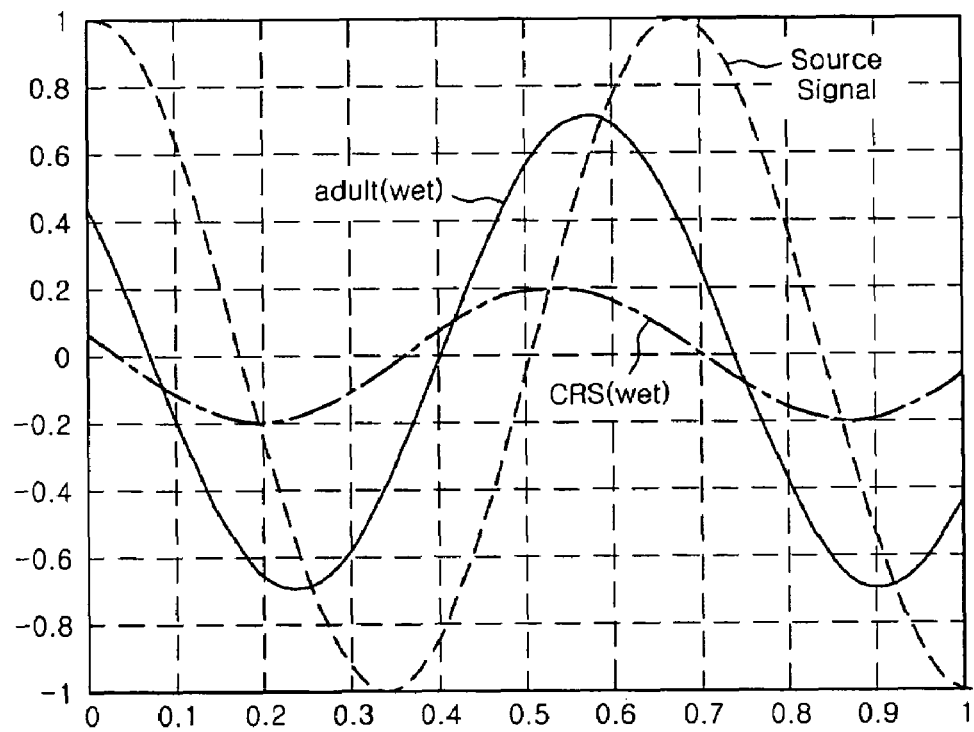
Figure 10:
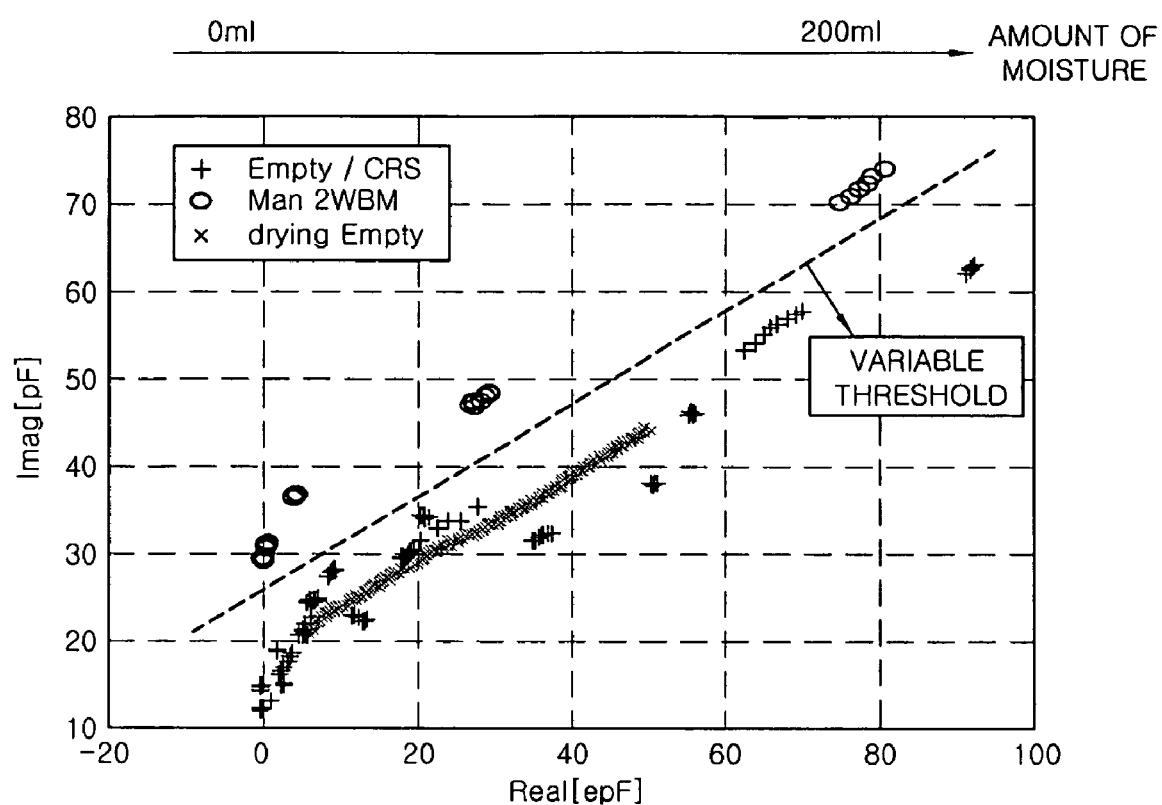

FIGS. 8 to 10 illustrate experimental result data in accordance to exemplary embodiments of the present invention.

FIG. 8 is a graph showing sensor output current measured for a dry seat by using an oscilloscope, and FIG. 9 is a graph showing sensor output current measure for a moist seat by using the oscilloscope. As shown in the drawings, the amplitude of the sensor output current measured for the moist seat is larger than that of the sensor output current measured for the dry seat.

In order to classify an occupant, variation in current, attributable to the permittivity of the occupant must be obtained from the waveform of the output current of FIG. 9 as precisely as possible. This is possible by measuring the imaginary current value, as described above.

The imaginary current value can be obtained by measuring the output current value at time points corresponding to 0.18, 0.5, and 0.84, referring to FIG. 9. The output current values measured at time points corresponding to 0.34 and 0.67 are real current values attributable to the resistance of moisture.

According to an exemplary embodiment of the present invention, FIG. 10 illustrates result data of the output currents measured for an empty seat, a CRS for an infant 1 year old or younger, and an adult while the amount of wetting of the seat is changed in a range from 0 to 200 Ml. Through the repetition of this experiment variable threshold values increasing in an upper-right direction can be obtained in the graph in which the real current is indicated on the horizontal axis and the imaginary current is indicated on the vertical axis.

According to the apparatus for classifying a vehicle occupant having the above construction, a vehicle occupant can be precisely classified using real current values and imaginary current values even if moisture permeates into a seat.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method for classifying a vehicle occupant, comprising:
   supplying Alternating Current (AC) power to a capacitive sensor installed in a seat of a vehicle;
   measuring a imaginary current value attributable to variation in capacitance of the sensor and a real current value attributable to variation in resistance of the sensor, using a current detector connected to an output side of the sensor;
   determining a threshold value based on the measured real current value and a threshold data set including predetermined pairs of reference imaginary current values and reference real current values, wherein the measured real current value acts as a determining factor for the threshold value and wherein the threshold value corresponds to a companion reference imaginary current value being paired with a companion reference real current value corresponding to the measured real current value; and
   classifying an occupant sitting in the seat by comparing the measured imaginary current value with the threshold value.

* * * * *